Dec. 11, 1945.   S. N. SETTERLUND   2,390,742
FOOD MIXER
Original Filed Nov. 3, 1939   2 Sheets-Sheet 2

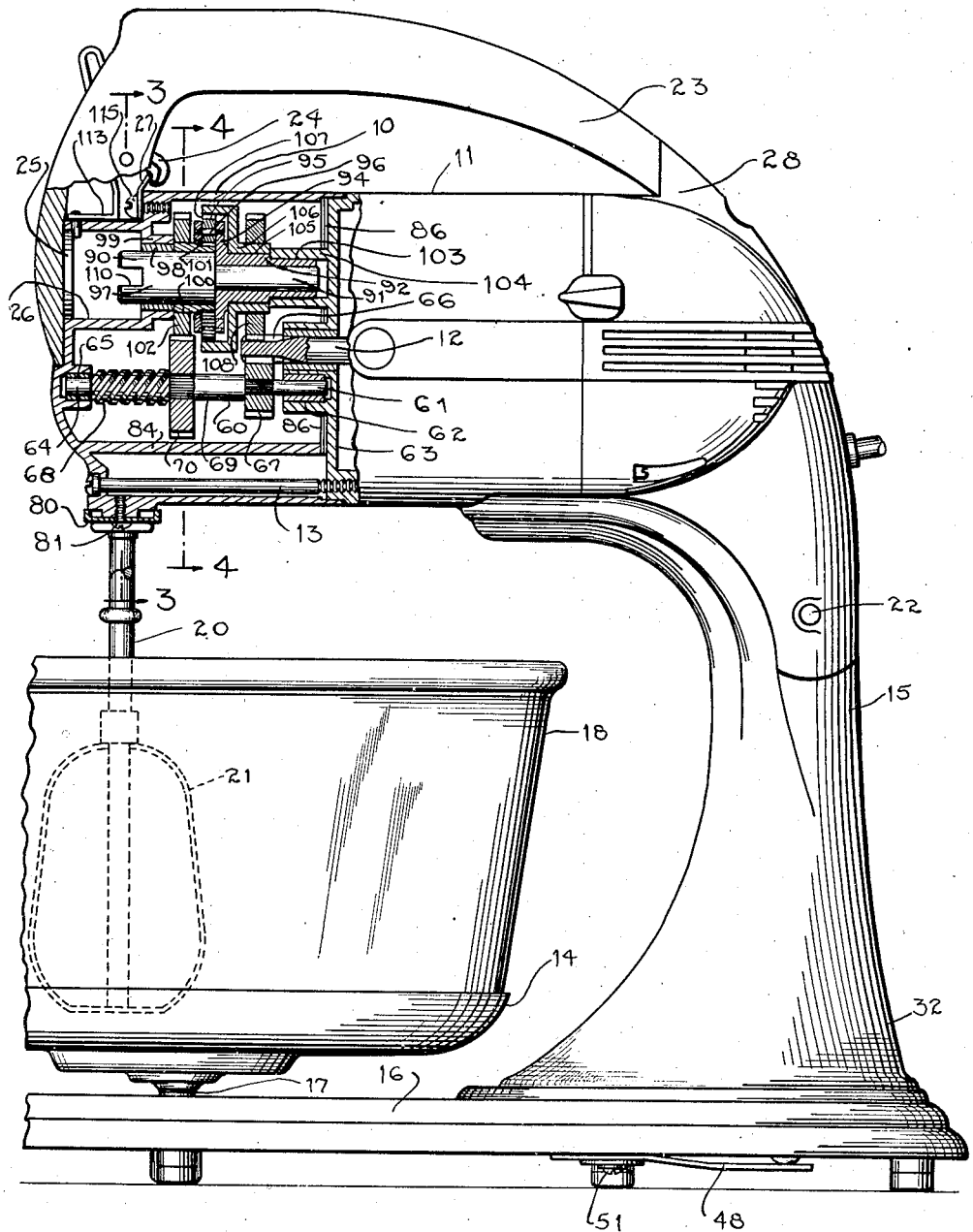

INVENTOR.
Sidney N. Setterlund
BY
His Attorney

Patented Dec. 11, 1945

2,390,742

UNITED STATES PATENT OFFICE 2,390,742

FOOD MIXER

Sidney N. Setterlund, Fort McClellan, Ala., assignor to A. F. Dormeyer Mfg. Company, Chicago, Ill., a corporation of Illinois Original application November 3, 1939, Serial No. 302,732. Divided and this application July 21, 1942, Serial No. 451,781

16 Claims. (Cl. 74—301)

The present invention relates generally to food mixers and more particularly to improvements in operating various food processing tools including the transmission and bodily movement of the tools during their operation.

This application is a division of my co-pending application, Serial No. 302,732, filed November 3, 1939.

In the use of a household appliance such as a food mixer which drives a plurality of food processing tools, a special mixing bowl is generally employed and rotatably mounted to operate in conjunction with the tools, particularly the food beater or beaters.

In view of the fact that varying volumes of liquid are mixed from time to time, bowls of various sizes are supplied to provide the best mixing results. Obviously the beaters must be small enough to work in the small bowls, yet be able to operate efficiently in the large bowls.

In connection with the food processing tools capable of use while the mixing operation is going on it is to be noted that, in many conventional devices, it is impossible or impractical to drive high torque low speed appliances, such as a meat grinder or food shredder, while the food beaters are operating in the bowl. This has arisen either because the food shredder must be powered from the beater sockets, or, within the limits of competitive manufacturing cost, the appliance is not built strong enough to carry safely the combined loads.

In this last instance, the difficulty confronting the manufacturer involves a balancing of expedients between an inexpensive fractional horsepower motor and an inexpensive transmission, a transmission such as one having double worm gear reductions that encounter high power losses for the two power takeoffs.

If the double worm transmission is employed the added expense of a stronger motor confronts the manufacturer. If a more efficient transmission is employed an added expense is encountered in the extra gearing which involves gear reductions as high as 15 to 1 upon the beater shaft and 250 to 1 ratio upon the beater shaft. Moreover, the 15 to 1 ratio upon the beater shaft is not acceptable for the best results in extracting juice from citrous fruits, and has to be remedied by added gearing. The preferred speed of juice extraction involves a gear reduction in the ratio of one hundred to one.

As a means for combating these contingencies and in order to meet competitive manufacturing costs, many manufacturers by their designs have heretofore prevented or avoided the possibility of work loads being carried by all three outlets of transmitted power at one time, namely, the food beaters, the low-speed food choppers, and the medium-speed juice extractors.

With this in mind, it is one of the objects of the present invention to provide a food mixer capable of driving all three food processing units simultaneously, and driving them in cooperation with the bodily movement of one of them, namely, the food beaters. Also, to drive them, or any one of them, without disturbing or impairing the operation of any one or all of the other food processing operations, and, in doing these things, avoid any spilling of the contents of the bowl when the beater and the bowl are moved relative to each other.

Another object of the invention is to provide an improved, compact, power output transmission, for any given applied horsepower, capable of carrying simultaneously all expected loads at all of the gear reduction ratios mentioned.

Furthermore, I provide a transmission mechanism which not only attains improved results, but also is less expensive and more simple in construction than conventional transmissions that afford comparable results when connected to motors of a given size or rating.

A further object of the invention is to enable a wide angle movement of the improved transmission and mixer so that whether the bowl is on the mixer base or near it, all of the food processing operations, being performed at any time, may be shifted relative thereto whenever desired.

In this connection it is desirable to provide maximum clearance and head room for as large a bowl as possible. The transmission of the present invention makes this possible. The beaters can be located nearer to the front end of the housing to provide a deeper overhang without materially shifting the center of supported weight.

A further object of the invention is to provide improved constructions and arrangement of parts relating to the several improvements and to provide a device which is simple and easy to assemble, durable under long periods of sustained heavy use, and inexpensive to manufacture and service.

These being among the objects of the invention, other and further objects will become apparent from the drawings, the description relating thereto and the appended claims.

Referring now to the drawings—

Fig. 1 is a side elevation partly in section of a food mixer incorporating certain embodiments selected to illustrate and supplement a clear and concise description of the invention;

Figures 2, 3, 4:
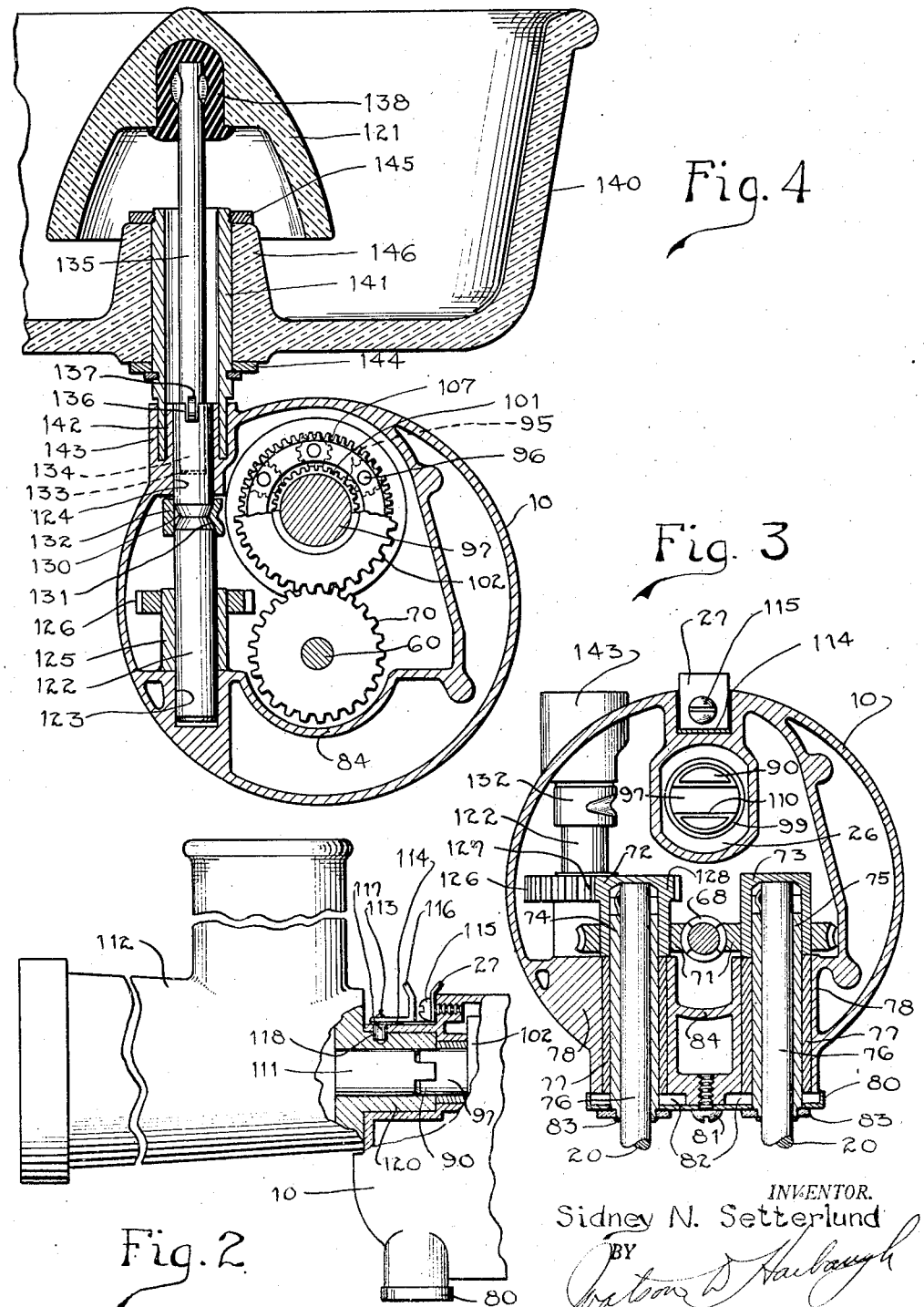
Fig. 2 is a fragmentary side elevation partly in section illustrating the manner in which a food processing device such as a meat chopper is attached for operation.
Fig. 3 is a section taken upon the line 3—3 in Fig. 1.
Fig. 4 is a section taken upon the line 4—4 of Fig. 1 with the construction and location of a juicer attachment shown as assembled therewith.

Referring now to the drawings in further detail:

A food mixer is shown in Fig. 1 comprising a gear housing 10 mounted upon the front end of an electrically powered motor unit 11 having an armature shaft 12 extending into the transmission housing. The transmission housing and motor driving unit are held together by bolts 13 in unitary relation as supported above a bowl carrying turntable 14 by means of a standard 15 mounted upon a base 16 in which the turntable 14 is journaled as at 17. The turntable supports bowls of varying sizes, a large one of which 18 is shown in place.

Beaters 20 are detachably carried by the transmission where they are disposed in the bowl as shown in dotted lines 21 in their lowered position with their axes offset slightly from the axes of the turntable 14. The beaters are raised and lowered with regard to the bowl by movement of the transmission and power unit about the horizontally disposed pivot pin 22 carried by the support 15 A handle for managing the transmission and power unit is indicated by the numeral 23 and is detachably mounted for removal by a latch 24. The handle carries the weight of the housing at its front end by means of a lug 25 fitting into the power takeoff socket 26 at the front of the transmission as held by the latch 24 against a keeper 27, and at the rear end of the handle by a projection (not shown) received in the boss 28 on top of the unit.

Whenever it is desirable to use the power takeoff socket 26 or the juicer attachment, the handle 23 is readily removed to clear the respective power shafts.

Referring now to the transmission, a countershaft for the motor shaft 12 is indicated at 60 which comprises a reduced end portion 61 journaled in a bearing 62 upon the front wall 63 of the motor housing 11. The front end 64 of the countershaft 60 is also of a reduced diameter and is journaled in a bearing 65 in the front end of the transmission housing 10. The front end of the motor shaft 12 has gear teeth 66 cut thereon and the reduced end portion 61 of the counter shaft has press fitted thereon a gear 67 mating with and driven by the teeth 66. The front end of the shaft 61 is provided with a worm gear 68 and upon the intermediate portion 69 of the shaft 60 another gear 70 is press fitted.

Referring now to Fig. 3, the worm 68 drives upon opposite sides thereof and in opposite directions two worm wheels 71 mounted upon caps 72 and 73 which in turn are press fitted on sleeves 74 and 75, respectively. The sleeves receive, in detachably mounted relation, the upper ends 76 of the beater shafts. The sleeves 74 and 75 are journaled in long bearings 77 provided in bosses 78 that are cast integrally with the transmission housing and the bearings are covered at their lower ends by a shield 80 secured to the bottom of the transmission housing by a screw 81. The cover serves as a gland means for holding grease packing 82 in place around the sleeves 74 and 75.

The caps 72 and 73 support the sleeves 74 and 75 against downward movement, and at the lower ends of the sleeves, rings 83 swaged thereto also serve to hold the shield 80 in place.

In the transmission housing a false bottom or floor 84 is provided to hold the gear lubricant in close proximity to the gears, it being more or less possible with this particular construction to provide a substantial supply of grease in this compartment, since, at the rear thereof a grease wall 86 is secured against the rear end of the false floor 84.

The power takeoff socket 26 is located above the shaft 60 where at the rear thereof a power take-off shaft 90 is provided which has a reduced rear end portion 91 press fitted in the sleeve 92 of a planetary gear member 94 having a plurality of planet gears 95 secured thereto by swaged pins 96 upon which they are journaled.

The power shaft 90 is provided with a larger cylindrical portion 97 which is journaled at its front end in the bearing 98 that is pressed into the boss 99. At the rear portion of the enlarged portion 97 the shaft 90 has journaled thereon a sleeve 100 which has cut therein the teeth 101 of a sun gear meshing with the planet gears 95. The sun gear has press fitted thereto a gear 102 driven by the gear 70 upon the countershaft 60.

At the rear end of the power take-off shaft 90, the sleeve 92 has two bearing surfaces of different diameters. The smaller one 103 of which, is journaled thereon the hub or shaft 106 of an internally toothed ring gear 107 meshing also with the planet gears 95. The ring gear is driven directly from the motor shaft 12 by means of a gear 108 press fitted to the hub 106 of the ring gear.

The operation of the transmission is such that the sun and ring gears are driven at comparative high speeds and at different speeds, the speed differential is preferably enough to provide a 250 to 1 reduction which is imposed upon the planet gears and from them transmitted to the power take-off shaft 90. The high speed of the gears make for low load on the gear teeth, thereby increasing longevity and durability of the transmission.

It will be noted that this arrangement is very compact without any worm gearing in the power take-off gear train, and lends itself to change for other gear ratios without altering the general organization. All gear engagements have rolling contacts and the change is simply accomplished by changing the ratio of the two gears 70 and 102.

It will also be noted that the motor shaft which has the highest speed and the full load is balanced against side thrusts. Moreover, the power loss at the balanced worm drive is minimized by an immediate shaft-speed reduction at the gears 66 and 67, the slower speed permitting the use of a larger diameter and more heavily multi-threaded worm and a smaller worm wheel and shorter bearings which permit a deeper overhang of the beaters.

Not only this, but the power take-off shaft carrying suddenly applied heavy loads now and then is not only provided with a 250 to 1 speed reduction in a small space, but also is positively powered by gears moving in the same direction with the load balanced all the way around the shaft without end thrust in a way reducing the bearing area needed.

The front end of the power take-off shaft 90 is provided with a rectangular slot 110 for engagement with a shaft of any one of a plurality of food treating attachments such as the shaft 111 upon the food chopper 112. The attachment is secured to the transmission housing by a snap latch 113 pressed by a spring 114 that is held in place by the same screw 115 with which the keeper 27 is fastened. The latch 113 comprises an angle member 116 riveted to the front end of the spring by a rivet 117 having an elongated head extending through the upper wall of the power take-off socket and so constructed and arranged as to engage a recess 118 upon the boss 120 of the food chopper into which it snaps when mating.

Whenever it is desirable to attach the food chopper, the handle 23 is removed by releasing the latch 24. The boss 120 is then inserted into the socket 26 with or without the upper end of the angle member 116 being pressed rearwardly to lift the stud 117 to clear the boss 120 until the recess 118 is reached. Detachment is in the reverse. The stud 117 is lifted and the boss 120 removed, whereupon the handle may be again locked in place.

Referring now to Fig. 4, a construction is shown whereby a fruit juicer is attached and the reamer 121 thereof driven from the power transmission at the proper speed.

The juicer shaft is indicated at 122 where it is journaled at its lower end in a socket 123 and at its upper end in a bearing 124. In the space between the two bearings the juicer shaft has secured thereto a sleeve 125 with a gear 126 mounted thereon by a press fit. The gear 126 is driven from the gear teeth 127 cut in the edge of a hooded portion 128 upon the sleeve 72. Adjacent its upper end the shaft is circumferentially grooved as at 130 to receive in locking relationship therewith a portion 131 upset therein from the body portion of a lock collar 132 at the time the shaft 122 is installed. Between the upper end of the collar 132 and the lower end of the sleeve 125 riding against the adjacent ends of the two bearings, the shaft is secured against longitudinal displacement in a manner holding the gear 126 in mesh with the gear teeth 127. At its upper end the shaft 122 is provided with a cylindrical bore 133 for receiving the complementary end portion 134 of a reamer shaft 135. Cross slots 136 are provided at the upper end of the juicer shaft 122 for receiving pressed radial flanges 137 carried by the reamer shaft 135.

The ream 121 may be constructed in any suitable manner and mounted upon the upper end of the reamer shaft 135 by means of a plastic 138.

The juicer bowl is indicated at 140 where it is mounted upon a sleeve 141 which extends into a cylindrical aperture 142 cut or dye cast in the boss 143 upon the transmission housing. The sleeve 141 supports the juicer bowl 140 by means of a supporting washer 144 at the bottom thereof and a clamp nut 145 threaded on the upper end of the sleeve against the upper end of a hub cast integrally with the bowl 140.

Having thus described my invention and discussed certain changes and modifications, and although a single embodiment has been illustrated, it will be apparent to those skilled in the art that various other uses, modifications and changes may be made without departing from the spirit and substance of the invention, the scope of which is commensurate with the appended claims.

What is claimed is:

1. In a food mixer having a transmission housing, a power unit the shaft of which has a gear upon one end thereof extending into the housing, a pair of gears in speed reduced engagement therewith upon opposite sides thereof, a shaft driven by each gear disposed parallel with each other on opposite sides of the power unit shaft, a multi-thread worm upon one of the driven shafts, spaced worm wheels disposed proximate the front of the housing upon opposite sides of the worm for rotation in opposite directions and driving shafts for supporting a plurality of beaters thereon, a driving gear upon each of said driven shafts, a gear driven by one of the driving gears driving in turn another gear with which is meshed a differential gear in mesh with the other of said driving gears, and means for driving a power take-off shaft from the differential gear.

2. In a food mixer, a drive shaft, a second shaft, means for driving the second shaft from the first shaft at a predetermined speed ratio, a third shaft driven from the second shaft and disposed at an angle thereto to provide power for a food attachment, two spaced gears of different pitch diameters mounted upon the second shaft, two members of a planetary gearing driven independently of each other at different speeds one by one of said two gears and the other by the driving shaft gear, and a third member of said planetary gearing responsive to said speed differential for driving a shaft adapted to power a second food processing attachment.

3. In a food processing device having a plurality of power delivering shafts for powering food processing attachments operable at different speeds, the combination of a prime mover, a pair of spaced gears driven by the prime mover, a second pair of gears driven by the first pair independently of each other and at different speeds, means responsive to the difference in speed between the second pair of gears for driving one of the shafts, speed reduction gearing driven in conjunction with the first pair of gears for driving another of said shafts, and means driven in conjunction with the reduction gearing for driving another of said shafts.

4. In a food processor having a plurality of power delivering shafts for powering food processing attachments operable at different speeds, the combination of a prime mover, gears in a gear housing driven by the prime mover, a second pair of gears driven independently of each other and at different speeds, means responsive to the difference in speed between the second pair of gears for driving one of the shafts, speed reduction gearing driven in conjunction with said gears for driving another of said shafts, and means driven in conjunction with the reduction gearing for driving another of said shafts, said shafts being capable of simultaneous operation from the prime mover and movable as a unit with said housing.

5. In a food mixer having a transmission housing, a power unit the shaft of which has a gear upon one end thereof extending into the housing, two gears in mesh and in speed reduced engagement therewith upon opposite sides thereof for a side thrust balance, two driven shafts journalled in the housing one of which is driven by one of the two gears, a multi thread worm upon said one of said driven shafts, spaced worm wheels disposed upon opposite sides of the worm for rotation in opposite directions, and driving shafts for supporting a plurality of beaters thereon, a driving gear upon said one of the driven shafts, two sleeves journalled upon the second driven shaft one of which carries the other of said two gears, a gear carried by the other sleeve and driven by said driving gear, a differential gear device interconnecting said sleeves and said second driven shaft including a ring gear carried by one of the sleeves and a sun gear carried by the other of said sleeves and a planetary gear and carrier secured to said second driven shaft, said second driven shaft being accessible from outside of the transmission for power takeoff purposes.

6. In a food mixer having spaced beater shafts driven by worm wheels, a drive shaft carrying a worm means disposed between said worm wheels to drive the wheels in opposite directions, two gears upon the drive shaft, a second shaft, two gears journalled on the second shaft and driven in geared relation to said first two gears independently of each other and at different speeds, a differential gear device carried by said second shaft including a third set of two gears driven by the two gears journalled on the second shaft and a third gear interconnecting said third set of two gears, said third gear driving said second shaft, and power takeoff means carried by said second shaft.

7. In a food mixer having spaced beater shafts driven by worm wheels, a shaft carrying a worm means driving said worm wheels in opposite directions, a pair of gears upon the shaft, one a driving gear and the other a driven gear, a power takeoff shaft, a pair of sleeve shafts journalled upon the power takeoff shaft, a driven gear on one sleeve in mesh with said drive gear, a driven gear upon the other sleeve, power means including a driving gear in mesh with the driven gear upon the second sleeve and the driven gear upon the first shaft, the driven gears upon the two sleeve shafts being driven at different speeds, second gears upon each of said sleeve shafts, a carrier upon said power takeoff shaft having a gear in mesh between said second gears upon said sleeves.

8. In a food mixer having a beater shaft carrying a juicer gear, a drive shaft including a gear for driving said beater shaft, a pair of drive gears upon the drive shaft, gear means including a pair of driven gears disposed in gear driven relationship to the drive gears independently of each other for rotation in opposite directions including a pinion gear between one of said drive gears and one of said driven gears, a third pair of gears driven from said driven gears, a gear in mesh with the gears of said third pair and responsive to the speed relationship between said driven gears for driving a power takeoff shaft, a shaft adapted to support a reamer shaft, and a gear upon the last said shaft in mesh with said juicer gear.

9. In a food mixer having a beater shaft driven by a worm wheel, a power transmitting shaft, means for driving said transmission shaft, a worm upon the transmission shaft driving said worm wheel, a pair of drive gears upon the transmission shaft, a driven gear in mesh with one of the drive gears, a second driven gear driven in stepped relationship with the other drive gear, said driven gears receiving a differential movement from the drive gears, and means driven by said driven gears and responsive to said differential movement for driving a power takeoff shaft.

10. A transmission including a driving shaft, a driving gear mounted thereon, two gears in mesh with the driving gear for rotation thereby, a countershaft supporting and driven by one of the two gears, a carrier shaft journalling the other of said two gears, a ring gear driven by said other of the two gears, a second gear carried by the countershaft, a second gear journalled upon the carrier shaft in mesh with the second gear upon the countershaft, a sun gear driven by the second carrier shaft gear, a planetary carrier, a planetary gear on the planetary carrier in mesh with the sun and ring gears, a power takeoff shaft driven by the planetary carrier, said second gears on the countershaft and carrier shaft driving the sun and ring gears at differential speeds, and a pair of beater shafts driven from one of said shafts.

11. In a food processing device having a vertical beater shaft driven by a worm wheel, a driven horizontal shaft, a worm on the horizontal shaft driving said worm wheel, a pair of gears on the horizontal shaft, two gears disposed coaxially with respect to each other one driven by one of said pair of gears and the other driven in stepped relation to the other of said pair of gears through an intermediate power driven pinion gear, said coaxial gears receiving a differential movement from their driving, a ring gear driven by one of the coaxial gears, a sun gear driven by the other of said coaxial gears, and planet gears in mesh with said ring and sun gears for driving a low speed shaft, said low speed shaft being coaxial with the sun and ring gears and in journalled relationship therewith.

12. In a food mixer having a beater shaft driven by a worm wheel, a driven shaft, a worm upon the driven shaft driving said worm wheel, a pair of gears upon the driven shaft, a second pair of gears driven in stepped relation with the first pair of gears independently of each other and at different speeds, means driven by said second pair of gears and responsive to said speed differential for driving a low speed shaft, and means upon the beater shaft for driving a power delivering shaft from the beater shaft.

13. In a food mixer having a normally vertically disposed beater shaft and horizontally disposed power take-off shaft, the combination of a drive shaft, a pair of gears driven from the drive shaft, a second pair of gears driven in stepped relation with the first pair of gears and rotated independently at different speeds, means responsive to said speed differential for driving said power take-off shaft, and means driven by one of said first pair of gears for driving said beater shaft.

14. In a food mixer having a beater shaft, the combination of a gear driven by a prime mover, a pair of gears in mesh with the first gear upon opposite sides thereof to divide the output torque of said first gear between them, a second pair of gears driven by the first pair of gears independently of each other and at different speeds, and means responsive to said speed differential for driving a low speed power take-off shaft, and means driven by one of said first pair of gears for driving said beater shaft.

15. A food mixer transmission including a driving gear, spaced driven gears driven from the driving gear independently of each other and at different speeds, means responsive to the speed differential between the two driven gears for operating a power take-off shaft disposed in a horizontal position, and a pair of shafts driven from one of said driven gears in opposite directions of rotation disposed in a vertical plane.

16. In a food mixer the combination of a prime mover driving a gear, a countershaft upon one side of the gear having spaced gears thereon one of which engages the first gear, planetary gearing including a ring gear member, a sun gear member and planet gears, one of said members being driven by the other of said countershaft gears and the other of said members being disposed upon the opposite side of and driven directly from said first gear, said two members rotating in opposite directions to provide a speed differential between them, a power take-off shaft carrying said planet gears and being rotated by said planet gears in response to said speed differential for driving an appliance at a low speed.

SIDNEY N. SETTERLUND.